Figure 1:
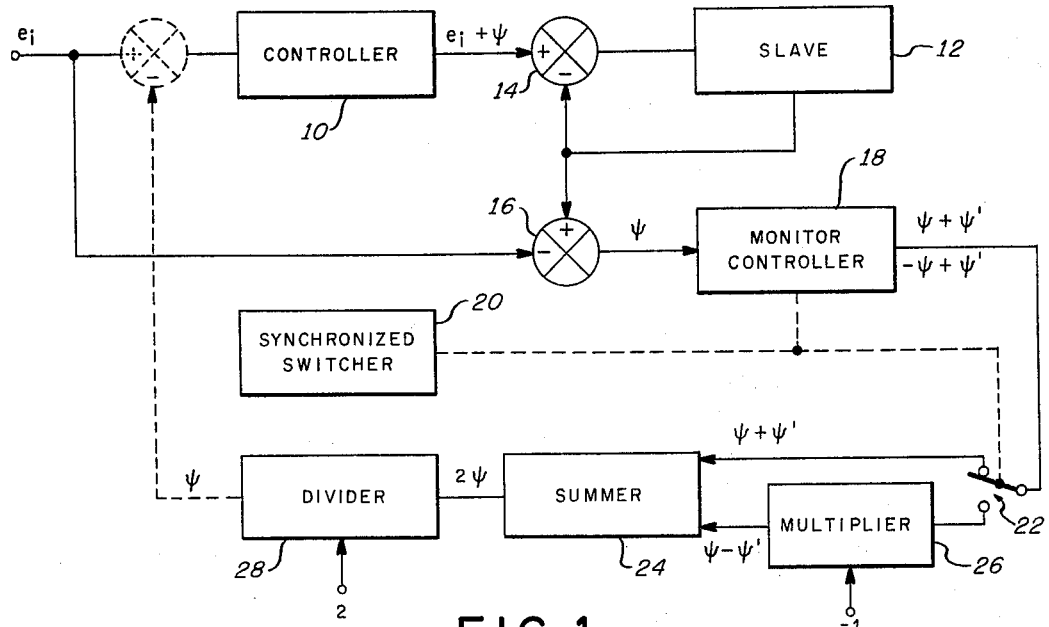

Sept. 13, 1966  G. J. WATT  3,272,018
MONITOR APPARATUS
Filed Nov. 1, 1963  2 Sheets-Sheet 1

INVENTOR.
GORDON J. WATT
BY
S.C. Yeaton
ATTORNEY

Sept. 13, 1966  G. J. WATT  3,272,018
MONITOR APPARATUS
Filed Nov. 1, 1963  2 Sheets-Sheet 2

INVENTOR.
GORDON J. WATT
BY
*S.C.Seaton*
ATTORNEY

United States Patent Office 3,272,018
Patented Sept. 13, 1966

3,272,018
MONITOR APPARATUS
Gordon J. Watt, Huntington Station, N.Y., assignor to Sperry Rand Corporation, Great Neck, N.Y., a corporation of Delaware
Filed Nov. 1, 1963, Ser. No. 321,392
20 Claims. (Cl. 74—5.34)

This invention relates to control apparatus and in particular provides a control system which negates the effects of errors which are introduced by the system's own controller.

The present invention has arisen as a result of a problem which is particularly complex when related to the inertial navigation of a submarine. Nuclear submarines are required to be submerged continually for an extended time period and the gyroscopes used to provide navigational references must be corrected for their own drift rate errors without resort to external fixes such as the heavens.

In one embodiment, the invention is employed with a stable table reference system. Mounted on the table is a gyroscope the inertial input axis of which is adapted to be oriented parallel to the latitude lines of the earth. As the ship in which the reference system is situated navigates, e.g. northerly, the gyroscope is made to receive signals which cause torques to be applied to the gyroscope, thereby providing gyroscope output signals. These output signals are applied then to tilt the table to keep both the plane of the table and the input axis of the gyroscope horizontal. In so tilting, the table (which supports the gyroscope) causes the gyroscope sensitive element to precess to counter the torques produced by the signals applied to the gyroscope. In this way the gyroscope and the table follow-up on each other to cancel continually the gyroscope output signals. Because of this, any drift of the gyroscope gets exhibited as a tilt in the horizontal attitude of the system's table. To counter this tilt-causing drift error, a second or monitor gyroscope is supported on the table of the system, being adapted to be periodically swung about so that is input axis points first in the same direction as that of the system's control gyroscope input axis, and second in a counter direction. Because the monitor gyroscope is supported by the same table as the control gyroscope, it sees the precession producing table tilt which is representative of the control gyroscope input signal and its own drift rate, respectively, and to wit $e_i + \psi$. By applying a counter torque signal $-e_i$ to the monitor gyroscope, the output signal from the monitor gyroscope will be representative of only the control gyroscope drift rate $\psi$ and its own drift rate $\psi'$. Now, realizing that the drift rate of the monitor gyroscope will be ordinarily steadily in one direction only, reversing the direction of the monitor gyroscope input axis will cause the precession producing signal component $\psi$ to reverse sign, with the monitor gyroscope's own drift rate component being continually of the same sign. Hence, the monitor gyroscope output signal will alternately be $(\psi + \psi')$ and $(-\psi + \psi')$, separation of the control gyroscope drift rate signal component from the two drift rate components being easily performed algebraically as follows:

$$\frac{(\psi + \psi') - (-\psi + \psi')}{2} = \psi$$

By decreasing the signal $e_i$ applied to the control gyroscope in proportion to $\psi$, drift rate thereof is corrected as it occurs.

A principal object of the present invention is to provide a control system that corrects for errors caused by components in the system.

Another object of the invention is to provide apparatus for producing a signal representing the error caused by a component in a control system.

Another object of the invention is to provide a stable table reference system which provides a correction signal representative of the error caused by the control element of such system.

Another object of the invention is to provide a stable table reference system which automatically corrects for errors introduced into the system by the components of the system.

Another object of the invention is to provide a stable table reference system having an inertial element in control of the attitude of the platform of the system and monitor element and related components responsive to produce an output signal representative only of monitor elements' own steady state bias and that of the control element.

Another object of the invention is to provide a stable table reference system having a gyroscope in control of the attitude of the platform of the system and a monitor gyroscope and related components responsive to produce an output signal representative only of the monitor gyroscope's own steady state drift and that of the control gyroscope.

Another object of the invention is to provide a stable table reference system having an accelerometer in control of the attitude of the platform of such system and a monitor accelerometer responsive to produce an output signal representative only of its own steady state bias and that of the control accelerometer.

Figure 2:
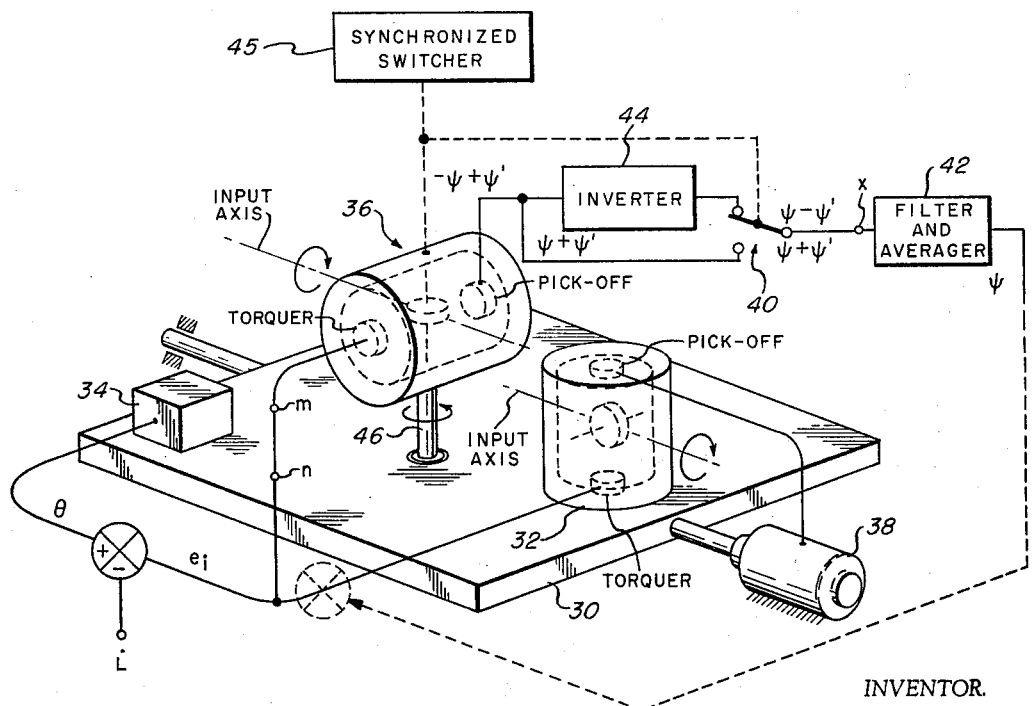
Figure 3A:
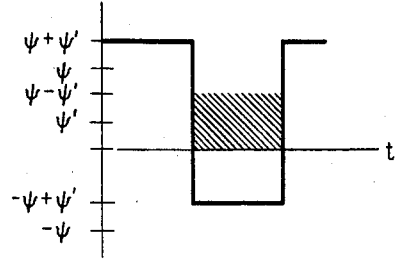
Figure 3B:
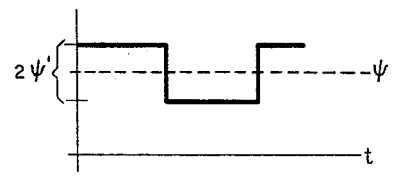
Figure 4:
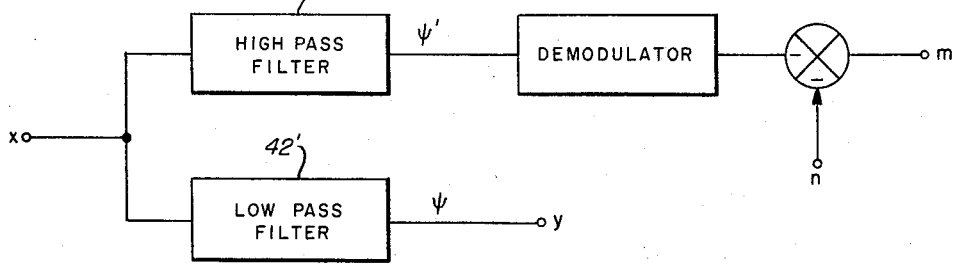
Figure 5:
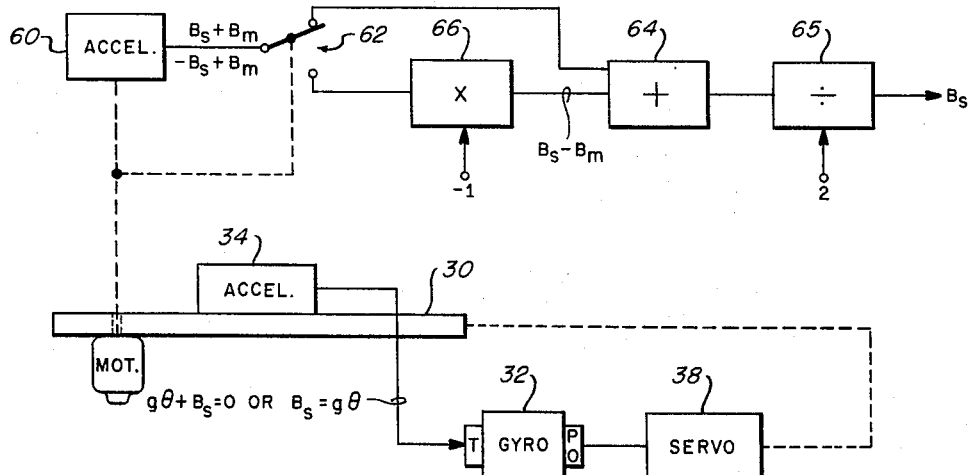

The invention will be described with reference to the figures wherein:

FIG. 1 is a block diagram useful in explaining the functions of the present invention, FIG. 2 is a schematic presentation partially in perspective depicting one embodiment of the invention, FIGS. 3a and 3b are diagrams useful in explaining the operation of the apparatus of FIG. 2, FIG. 4 is a block diagram of apparatus adapted to be substituted into the apparatus of FIG. 2 to provide another form of the invention, FIG. 5 is a block diagram of still another form of the invention.

Before describing specific applications of the concepts of the invention, details will be described with reference to FIG. 1, setting forth algebraic operations required to practice the invention. A controller 10 adapted to receive a signal $e_i$ and provide an output signal for the control of a slave element 12 provides an output signal $e_i + \Psi$, the signal component $\psi$ being representative of an error caused by the controller 10 itself. As the slave element 12 responds to the signal $e_i + \Psi$, it produces an output signal sufficient to cancel the signal $e_i + \psi$. In other words, a summing element 14 adapted to receive the signal $e_i + \psi$ and a signal representative of the response of the slave element 12 produces, because of follow-up, substantially no output signal at all times. By applying the signal $e_i$ and the signal representative of the output response of the slave element 12 through a subtracting element 16 to a monitor controller 18, the monitor controller may be made to respond generally to a resultant signal representative of the error $\psi$ produced by the controller 10. However, because the monitor controller 18 is itself an error producing component, the output signal which will be provided by the monitor controller 18 will be representative of both the errors produced by the respective controllers 10 and 18.

Assuming that the error which gets introduced by the monitor controller 18 is always of a single direction, reversal of the effect which the signal $\psi$ causes the monitor controller 18 will cause the monitor controller 18 to provide either a signal $(\psi + \psi')$ or a signal $(-\psi + \psi')$.

A synchronized switcher 20, therefore, is adapted to reverse periodically the effect which the signal $\psi$ has on the monitor controller 18, being further adapted simultaneously to operate a switch 22 and apply the monitor controller 18 output signal either directly to a summer 24 or to said summer 24 through a multiplier 26, such multiplier 26 being adapted to multiply the monitor controller 18 output signal by a signal representative of minus one. In this way, the synchronized switcher 20 causes an inversion of the polarities of the signal components $-\psi$ and $+\psi'$ when the monitor controller 18 provides an output signal $(-\psi+\psi')$. (If preferred, a subtractor may be substituted for the multiplier 26-summer 24 combination, with the signal $(-\psi+\psi')$ appearing at the output of the controller 18 being always a subtrahend signal.) The summer 24 output signal is then applied to a divider 28 adapted to halve its input signal and thereby provide a signal $\psi$ representative of the error caused solely by the controller 10. By applying the signal $\psi$ in feedback as shown by the dashed line of FIG. 1 to cancel partially the signal $e_i$, continual correction of the controller 10 for its own self-caused error is possible.

Referring now to actual apparatus embodying the invention (FIG. 2), a stable table reference system has a platform 30 adapted to support a gyroscope 32, the inertial input axis of which is indicated as such. The gyroscope 32 is adapted to receive an input signal $e_i$ which is producible, for example, by algebraically adding the signals $\dot{L}$ and $\theta$. In this form of the invention, the gyroscope 32 takes the form of an azimuth control gyroscope and is adapted to have its inertial input axis oriented in the direction of the latitude lines of the earth, the signal $\dot{L}$ being representative of northerly velocity and the signal $\theta$, which is provided by an accelerometer 34, being indicative of the tilt of the platform 30. Supported for rotation in a plane parallel to the plane of the platform 30 is a monitor gyroscope 36 the inertial input axis of which is adapted to be quiescently parallel to the inertial input axis of the gyroscope 32. A control servo 38 receives the pickoff output signal from the gyroscope 32 and changes the tilt of the platform 30 to cancel such output signal, thereby causing the signal $\theta$ to go to zero also. Absent the feedback arrangement of the present invention, both the gyroscopes 32 and 36 are adapted to receive the signal $e_i$ which exerts torques about their respective output axes. The pick-off output signal from the gyroscope 36 is applied, depending respectively on whether the switch 40 is in its lower or upper positions, either through a switch 40 to a filter and averager 42, or to such filter and averager 42 through an inverter 44 and then through the switch 40. The filter and averager performs the functions of elements 24, 26 and 28 of FIG. 1; likewise, FIG. 2 elements 30, 32 and 36 find their analogs in FIG. 1 elements 12, 10 and 18 respectively, the pick-off of the FIG. 2 gyroscopes 32 and 36 being the analogs of FIG. 1 elements 16 and 14 respectively. The switch 40 is operated by a synchronized switcher 45 which operates to reverse periodically the direction in which the inertial input axis of the gyroscope 36 points. The synchronized switcher may take a plurality of forms, e.g. it may continually rotate the gyroscope about its supporting shaft 46, or it may through suitable linkages rock the gyroscope 36 back and forth in seesaw fashion, etc. In practicing the presently preferred form of the invention, the output signal from the filter and averager 42 is applied either in feedback fashion (as shown by the dashed line of FIG. 2) to reduce the magnitude of the signal $e_i$ in proportion thereto, or in like manner to reduce the signal applied to the servo 38.

For an understanding of the operation of the apparatus of FIG. 2, reference should be had also to FIGS. 3a and 3b which show how the switching operation performed by the apparatus of FIG. 2 affects the signals applied to and received from the filter and averager 42. With a signal $e_i$ applied to the gyroscope 32, the direction of its inertial input axis starts to change. As this happens, an output signal is received by the servo 38 from the gyroscope 32 pick-off. Instantly, the table platform 30 starts to tilt and in so doing precessional torques are applied to the gyroscope 32 causing the output signal from the gyroscope pick-off to abate. Because of small imbalances etc. in the makeup of the gyroscope 32, small torques are exhibited which cause it to precess even when it receives no signal $e_i$. Therefore, signals are continually being applied from the gyroscope 32 pick-off to the servo 38 causing continually the tilt of the platform 30 to increase more and more in error. Now, with a signal $e_i$ (if any) being applied to the gyroscope 36, precessional torques produced when the platform 30 tilts may be made to cause the gyroscope 36 output signal to be representative at least to some extent of the difference between the signal $e_i$ applied to the gyroscope 36 and a signal representative of the tilt of the platform 30. However, because the monitor gyroscope 36 itself introduces a drift signal component $\psi'$ into its own output signal the signal component $\psi$ which is representative of the drift rate of the gyroscope 32 is obscured. By reversing periodically the direction in which the inertial input axis of the gyroscope 36 points, the output signal from such gyroscope is either $\psi+\psi'$ or $-\psi+\psi'$. This can be seen to be true because the platform tilt rate (which equals the gyroscope 32 drift rate) seen by the gyroscope 36 will be dependent upon the direction of the inertial input axis of the gyroscope 36, whereas the direction of the drift rate of the gyroscope 36 will remain unchanged always. With a signal $\psi+\psi'$ applied to the filter and averager 42 when the switch 40 is in its lower position, and with the signal $(-\psi+\psi')$ applied through the inverter 44 to the filter and averager 42 when the switch 40 is in its upper position, a signal $\psi$ will appear at the output of the filter and averager 42 as indicated by the dashed line of FIG. 3b. That is, appearing at the output of the gyroscope 36 is a pick-off signal which alternates in polarity and magnitude as depicted in FIG. 3a; by timely applying such signal through the inverter and switch 40 the signal portion appearing below the time base of FIGS. 3a may be inverted so as to occupy timewise the area indicated by crosshatching. In other words, appearing at the input to the filter and averager 42 is a D.C. signal having an alternating component as shown in FIG. 3b. By applying such signal through the filter and averager 42, a smoothed signal $\psi$ representative of the drift rate of the gyroscope 32 is provided. This signal is then applied to cancel partially the signal $e_i$ applied to the gyroscope 32.

For further improvements in performance, the apparatus depicted in FIG. 4 may be connected to FIG. 2 points $x$, $m$ and $n$ instead of the presently connected filter and averager 42 and the conductor between points $m$ and $n$. With such the case, signals representing the drift rates of both the control gyroscope 32 and the monitor gyroscope 36 may be provided. Shown in FIG. 4 is a low-pass filter 42' which operates exactly like the filter and averager 42 of FIG. 2, passing only the signal $\psi$. A high-pass filter 43 receives the signals passed by the switch 40 and blocks all but the alternating component representative of $\psi'$. The alternating signal component $\psi'$ is then applied to a demodulator which converts it to a form useful for reducing the signal $e_i$ applied to the gyroscope 36, i.e. the signal $e_i$ here is reduced in proportion to the drift rate $\psi'$ of such gyroscope. In this form of the invention both the control gyroscope and the monitor gyroscope act to monitor and correct for the drift rates of each other.

While the gyroscope 36 is shown with the spin axis of its sensitive element coincidental with the axis of reversal for the gyroscope 36, such need not be the case to practice the invention; however, the orientation depicted in FIG. 2 is preferred for to do otherwise would mean that torques would be continually applied to the gyroscope 36 sensitive element during reversals, which is not the case with the configuration shown. Also, the gyroscope 36 may obviously be time shared for use in monitoring a system control gyroscope the input axis of which is both perpendicular to the input axis of the gyroscope 32 and the plane of the platform 30, this being by providing the monitor gyroscope with four quiescent positions (each orthogonal with respect to the other) and appropriately adapting the switch 40.

The invention as described above has been employed to monitor operation of a gyroscope in control of a stable table. The invention may likewise be employed to provide a signal representative of the stand-off bias of the FIG. 2 accelerometer 34. For example, in FIG. 5, a second accelerometer 60 is supported, just as the gyroscope 36 was, for rotation about an axis perpendicular to the plane of the platform 30. The output signal from the accelerometer 60 is applied through a switch 62 either directly to a summer 64 or to such summer through a multiplier 66. The multiplier 66 operates to multiply its received signal by minus one. The summer output signal is applied then to a divider 65 which halves its received input signal.

Now, assuming the stable table is fixed at a certain geographic location, the output signal from the accelerometer 34 will be representative of $g\theta$ (where $\theta$ is representative of the tilt of the platform 30) plus an internal bias $B_S$ caused within the accelerometer. In other words, because the gyroscope 32-servo 38 follow-up arrangement described above reacts to output signals from the accelerometer 34, the bias $B_S$ of the accelerometer 34 will be exhibited as an erroneous tilt $\theta$ (as measured in units of $g$) in the attitude of the platform 30. Since the accelerometer 60 is also supported by the platform 30, it too sees the signal $B_S$ in terms of platform tilt. By reversing periodically the input axis of the monitor accelerometer 60, its output signal will be representative of $B_S+B_M$ and $-B_S+B_M$ (where $B_M$ is the internal bias of the monitor accelerometer 60 having naturally only a single direction). By reversing signals as discussed with reference to FIGS. 1 and 2, and in the manner shown by FIGS. 3a and 3b, a signal $B_S$ representative of the bias of the accelerometer 34 may be provided. Such bias may then be cancelled either electrically or mechanically by adjusting the accelerometer 34 until the signal $B_S$ appearing at the output of the divider 65 goes to zero.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a system having controllable means and a controller for controlling said controllable means in accordance with an input signal received by said controller, means producing a signal representative of the difference between the movement that said controllable means actually experiences and the movement that it should experience in response to said input signal, controller means receiving said difference signal and having a controllable element movable in response thereto to provide output signals, means for alternately applying said difference signal to move said controllable element in counter directions, whereby the output signals from said controller means may alternately be of opposite polarities, means modulating every other output signal from said controller means to reverse its polarity, whereby a composite correction signal of said output signals taken along the same time base is provided having an alternating component of the same frequency that said difference signal is alternately applied to move the controllable element of said controller means.

2. The apparatus of claim 1 including means for filtering away the alternating component of the composite signal to provide a bias signal representative of the error that the controller itself introduces into the control of the controllable means.

3. The apparatus of claim 2 including means for decreasing the magnitude of the input signal to the controller in proportion to said bias signal.

4. The apparatus of claim 1 including means for separating the two frequency components of said composite signal to provide a first bias signal representative of said alternating component and a second bias signal representative of the remainder of said composite signal, and means for decreasing the magnitude of the signal applied to the controller in proportion to the magnitude of said second bias signal, and means for decreasing the magnitude of the signal applied to said controller means in proportion to said first bias signal.

5. A system for maintaining a spacial reference comprising first controller means having an inertial sensitive element adapted to respond to a disturbance relative to its input axis and provide an output signal, reference means supporting said first controller means responsive to said output signal to position spacially said reference supporting means so as to negate the effect of any such disturbance, second controller means having an inertial sensitive element and adapted to produce output signals in response to disturbances relative an axis oriented in the same direction as the input axis of said first controller means, said second controller means being supported also on said supporting means and being adapted to receive a counter disturbance equal to the disturbance received by said first controller means, whereby output signals from said second controller means have respective components of the position errors of the respective sensitive elements of both said controller means, means for filtering away the position error of the sensitive element of said second controller means to provide a signal representative of the position error of the first controller means sensitive element, and means responsive to the last-named signal to counter-disturb the sensitive element of said first controller means in proportion thereto.

6. A system for maintaining a spacial reference comprising first controller means having an inertial sensitive element adapted to respond to a disturbance relative to its input axis and provide an output signal, reference means supporting said first controller means responsive to said output signal to position spacially said supporting means so as to negate the effect of any such disturbance, second controller means having an inertial sensitive element and adapted to produce output signals in response to disturbances relative an axis oriented in the same direction as the input axis of said first controller means, said second controller means being supported also on said supporting means and being adapted to receive a counter disturbance equal to the disturbance received by said first controller means, whereby output signals from said second controller means have respective components of the position errors of the respective sensitive elements of both said controller means, signal modifying means alternately making said second controller means output signals representative of disturbances in counter directions with respect to the same axis of said second controller means, whereby the output signals may alternately be of opposite polarities, means modulating every other output signal from said second controller means to reverse its polarity, whereby a composite correction signal of said output signals taken along the same time base is provided having an alternating component equal in frequency to that at which the signal modifying means alternately modifies the output signals of said second controller means.

7. The apparatus of claim 6 including means for filtering away the alternating component of the composite signal to provide a bias signal representative of the error that said first controller means itself introduces into the spacial orientation of said reference supporting means.

8. The apparatus of claim 7 including means for counter disturbing the sensitive element of said first controller means in proportion to said bias signal.

9. The apparatus of claim 6 including means for separating the two frequency components of said composite signal to provide a first bias signal representative of said alternating component and a second bias signal representative of the remainder of said composite signal, and means for counter disturbing the sensitive element of said first controller means in proportion to the magnitude of said first bias signal, and means counter disturbing the sensitive element of said second controller means in proportion to said first bias signal.

10. A system for maintaining a spacial reference comprising first controller means having an inertial sensitive element adapted to respond to a disturbance relative to its input axis and provide an output signal, reference means supporting said first controller means responsive to said output signal to position spacially said supporting means so as to negate the effect of any such disturbance, second controller means having an inertial sensitive element and adapted to produce output signals in response to disturbances relative an axis oriented in the same direction as the input axis of said first controller means, said second controller means being supported also on said supporting means and being adapted to receive a counter disturbance equal to the disturbance received by said first controller means, whereby output signals from said second controller means have respective components of the position errors of the respective sensitive elements of both said controller means, means alternating the direction of the input axis of said second controller means, whereby the output signals may alternately be of opposite polarities, means modulating every other output signal from said controller means to reverse its polarity, whereby a composite correction signal of said output signals taken along the same time base is provided having an alternating component equal in frequency to that at which the signal modifying means alternately modifies the output signals of said second controller means.

11. In a stable table reference system having a control gyroscope that provides output signals representative of the displacement between its sensitive element and its housing, said gyroscope being adapted to receive input signals which create torques about an output axis of said gyroscope, and a platform positionable in response to said output signals and so supporting said gyroscope housing that as the platform gets oriented precessional counter torques are applied to the gyroscope to cancel said output signals, a monitor gyroscope mounted on said platform and adapted to be rotatable about an axis perpendicular to the plane of said platform, said monitor gyroscope being adapted to receive and produce respective input and output signals like said control gyroscope, the input axis of said monitor gyroscope having a quiescent orientation parallel to the input axis of said control gyroscope, means producing table positioning signals, said positioning signals being applied to both said gyroscopes, whereby the table is positioned in response to the output signals from said control gyroscope, positioning of said table causing precessional counter torques about the output axis of said monitor gyroscope which operate to cancel the torques produced by said applied table positioning signals, means alternately reversing the direction of said monitor gyroscope input axis whereby the output signals from said monitor gyroscope become modulated and contain signal components representative of the drift errors of both said gyroscopes, and means filtering away the drift error signal component of the monitor gyroscope, whereby an error signal is provided for decreasing the table positioning signal adapted to be applied to said control gyroscope.

12. In a stable table reference system having a control gyroscope that provides output signals representative of the displacement between its sensitive element and its housing, said gyroscope being adapted to receive input signals which create torques about an output axis of said gyroscope, and a platform positionable in response to said output signals and so supporting said gyroscope housing that as the platform gets oriented precessional counter torques are applied to the gyroscope to cancel said output signals, a monitor gyroscope mounted on said platform and adapted to be rotatable about an axis perpendicular to the plane of said platform, said monitor gyroscope being adapted to receive and produce respective input and output signals like said control gyroscope, the input axis of said monitor gyroscope having a quiescent orientation parallel to the input axis of said control gyroscope, means producing table positioning signals, said positioning signals being applied to both said gyroscopes, whereby the table is positioned in response to the output signals from said control gyroscope, positioning of said table causing precessional counter torques about the output axis of said monitor gyroscope which operates to cancel the torques produced by said applied table positioning signals, means alternately reversing the direction of said monitor gyroscope input axis whereby the output signals from said monitor gyroscope become modulated and contain signal components representative of the drift errors of both said gyroscopes, and means filtering away the drift error signal component of the monitor gyroscope to provide a correction signal, and means decreasing the signal applied to said control gyroscope in proportion to the magnitude of said correction signal.

13. In a stable table reference system having a control gyroscope that provides output signals representative of the displacement between its sensitive element and its housing, said gyroscope being adapted to receive input signals which create torques about an output axis of said gyroscope, and a platform positionable in response to said output signals and so supporting said gyroscope housing that as the platform gets oriented precessional counter torques are applied to the gyroscope to cancel said output signals, a monitor gyroscope mounted on said platform said adapted to be rotatable about an axis perpendicular to the plane of said platform, said monitor gyroscope being adapted to receive and produce respective input and output signals like said control gyroscope, the input axis of said monitor gyroscope having a quiescent orientation parallel to the input axis of said control gyroscope, means producing table positioning signals, said positioning signals being applied to both said gyroscopes, whereby the table is positioned in response to the output signals from said control gyroscope, positioning of said table causing precessional counter torques about the output axis of said monitor gyroscope which tend to cancel the torques produced by said applied table positioning signals, means alternately reversing the direction of said monitor gyroscope input axis whereby the output signals from said monitor gyroscope become modulated and contain signal components representative of the drift errors of both said gyroscopes, and means separating the signal representative components of said drift errors to provide respective correction signals, means decreasing the signal applied to said monitor gyroscope in proportion to its representative drift error correction signal, and means decreasing the signal applied to said control gyroscope in proportion to its representative drift correction signal.

14. A stable table reference system comprising a control gyroscope that provides output signals representative of the displacement between its sensitive element and its housing, said gyroscope being adapted to receive input signals which create torques about an output axis of said gyroscope, and a platform positionable in response to said output signals and so supporting said gyroscope housing that as the platform gets oriented precessional counter torques are applied to the gyroscope to cancel said output signals, a monitor gyroscope mounted on said platform and adapted to be rotatable about an axis perpendicular to the plane of said platform, said monitor gyroscope being adapted to receive and produce respective input and output signals like said control gyroscope, the input axis of said monitor gyroscope having a quiescent orientation parallel to the input axis of said control gyroscope, means producing table positioning signals, said positioning signals being applied to both said gyroscopes, whereby the table is positioned in response to the output signals from said control gyroscope, positioning of said table causing precessional counter torques about the output axis of said monitor gyroscope for cancelling the torques produced by said table positioning signals, means alternately reversing the direction of said monitor gyroscope input axis whereby the output signals from said monitor gyroscope become modulated and contain signal components representative of the drift errors of both said gyroscopes, and means filtering away the drift error signal component of the monitor gyroscope, whereby an error signal is provided for decreasing the table positioning signal adapted to be applied to said control gyroscope.

15. A stable table reference system comprising a control gyroscope that provides output signals representative of the displacement between its sensitive element and its housing, said gyroscope being adapted to receive input signals which create torques about an output axis of said gyroscope, and a platform positionable in response to said output signals and so supporting said gyroscope housing that as the platform gets oriented precessional counter torques are applied to the gyroscope to cancel said output signals, a monitor gyroscope mounted on said platform and adapted to be rotatable about an axis perpendicular to the plane of said platform, said monitor gyroscope being adapted to receive and produce respective input and output signals like said control gyroscope, the input axis of said monitor gyroscope having a quiescent orientation parallel to the input axis of said control gyroscope, means producing table positioning signals, said positioning signals being applied to both said gyroscopes, whereby the table is positioned in response to the output signals from said control gyroscope, positioning of said table causing precessional counter torques about the output axis of said monitor gyroscope for cancelling the torques produced by said table positioning signals, means for alternately reversing the direction of said monitor gyroscope input axis whereby the output signals from said monitor gyroscope become modulated and contain signal components representative of the drift errors of both said gyroscopes, and means filtering away the drift error signal component of the monitor gyroscope to provide a correction signal, and means decreasing the signal applied to said control gyroscope in proportion to the magnitude of said correction signal.

16. A stable table reference system comprising a control gyroscope that provides output signals representative of the displacement between its sensitive element and its housing, said gyroscope being adapted to receive input signals which create torques about an output axis of said gyroscope, and a platform positionable in response to said output signals and so supporting said gyroscope housing that as the platform gets oriented precessional counter torques are applied to the gyroscope to cancel said output signals, a monitor gyroscope mounted on said platform and adapted to be rotatable about an axis perpendicular to the plane of said platform, said monitor gyroscope being adapted to receive and produce respective input and output signals like said control gyroscope, the input axis of said monitor gyroscope having a quiescent orientation parallel to the input axis of said control gyroscope, means producing table positioning signals, said positioning signals being applied to both said gyroscopes, whereby the table is positioned in response to the output signals from said control gyroscope, positioning of said table causing precessional counter torques about the output axis of said monitor gyroscope for cancelling the torques produced by said table positioning signals, means alternately reversing the direction of said monitor gyroscope input axis whereby the output signals from said monitor gyroscope become modulated and contain signal components representative of the drift errors of both said gyroscopes, and means separating the signal representative components of said drift errors to provide respective correction signals, means decreasing the signal applied to said monitor gyroscope in proportion to its representative drift error correction signal, and means decreasing the signal applied to said control gyroscope in proportion to its representative drift correction signal.

17. In a stable table reference system having a control gyroscope that provides output signals representative of the displacement between its sensitive element and its housing, said gyroscope being adapted to receive input signals which create torques about an output axis of said gyroscope, and a platform positionable in response to said output signals and so supporting said gyroscope housing that as the platform gets oriented precessional counter torques are applied to the gyroscope to cancel said output signals, a monitor gyroscope mounted on said platform and adapted to be rotatable about an axis perpendicular to the plane of said platform, said monitor gyroscope being adapted to receive and produce respective input and output signals like said control gyroscope, the input axis of said monitor gyroscope having a quiescent orientation parallel to the input axis of said control gyroscope, means producing table positioning signals, said positioning signals being applied to both said gyroscopes, whereby the table is positioned in response to the output signals from said control gyroscope, positioning of said table causing precessional counter torques about the output axis of said monitor gyroscope for cancelling the torques produced by said table positioning signals, means alternately reversing the direction of said monitor gyroscope input axis, first means receiving the output signal from said monitor gyroscope when the input axis of said gyroscope points in the same direction as the input axis of said control gyroscope, second means receiving the output signal from said monitor gyroscope when its input axis has a direction opposite that of the control gyroscope input axis and reversing the polarity of such signal, means alternately receiving signals from said first and second means producing a composite signal taken along the same time base, filter means for blocking the signal component of the composite signal which has a frequency equal to the frequency at which the monitor gyroscope is reversed, whereby the signal component not blocked by said filter means may be used to diminsh the signal applied to the control gyroscope.

18. The apparatus of claim 17 wherein the monitor gyroscope has its spin axis perpendicular to the axis of reversal.

19. In a stable table reference system having a control gyroscope that provides output signals representative of the displacement between its sensitive element and its housing, said gyroscope being adapted to receive input signals which create torques about an output axis of said gyroscope, and a platform positionable in response to said output signals and so supporting said gyroscope housing that as the platform gets oriented precessional counter torques are applied to the gyroscope to cancel said output signals, a monitor gyroscope mounted on said platform and adapted to be rotatable about an axis perpendicular to the plane of said platform, said monitor gyroscope being adapted to receive and produce respective input and output signals like said control gyroscope, the input axis of said monitor gyroscope having a quiescent orientation parallel to the input axis of said control gyroscope, means producing table positioning signals, said positioning signals being applied to both said gyroscopes, whereby the table is positioned in response to the output signals from said control gyroscope, positioning of said table causing precessional counter torques about the output axis of said monitor gyroscope that tend to cancel the torques produced by said table positioning signals, means alternately reversing the direction of said monitor gyroscope input axis, first means receiving the output signal from said monitor gyroscope when the input axis of said gyroscope points in the same direction as the input axis of said control gyroscope, second means receiving the output signal from said monitor gyroscope when its input axis has a direction opposite that of the control gyroscope input axis and reversing the polarity of such signal, means alternately receiving signals from said first and second means producing a composite signal taken along the same time base, filter means for blocking the signal component of the composite signal which has a frequency equal to the frequency at which the monitor gyroscope is reversed, and means for receiving the output signal from said filter means and decreasing the signal applied to said control gyroscope in proportion thereto.

20. In a stable table reference system having a control gyroscope that provides output signals representative of the displacement between its sensitive element and its housing, said gyroscope being adapted to receive input signals which create torques about an output axis of said gyroscope, and a platform positionable in response to said output signals and so supporting said gyroscope housing that as the platform gets oriented precessional counter torques are applied to the gyroscope to cancel said output signals, a monitor gyroscope mounted on said platform and adapted to be rotatable about an axis perpendicular to the plane of said platform, said monitor gyroscope being adapted to receive and produce respective input and output signals like said control gyroscope, the input axis of said monitor gyroscope having a quiescent orientation parallel to the input axis of said control gyroscope, means producing table positioning signals, said positioning signals being applied to both said gyroscopes, whereby the table is positioned in response to the output signals from said control gyroscope, positioning of said table causing precessional counter torques about the output axis of said monitor gyroscope for cancelling the torques produced by said table positioning signals, means alternately reversing the direction of said monitor gyroscope input axis, first means receiving the output signal from said monitor gyroscope when the input axis of said gyroscope points in the same direction as the input axis of said control gyroscope, second means receiving the output signal from said monitor gyroscope when its input axis has a direction opposite that of the control gyroscope input axis and reversing the polarity of such signal, means alternately receiving signals from said first and second means producing a composite signal taken along the same time base, filter means for extracting a first signal component of the composite signal which has a frequency equal to the frequency at which the monitor gyroscope is reversed to provide two distinct signal components, means receiving the first signal component and decreasing the signal applied to the monitor gyroscope in proportion thereto, and means receiving the other signal component and decreasing the signal applied to said control gyroscope in proportion thereto.

References Cited by the Examiner

UNITED STATES PATENTS

| | | | |
|---|---|---|---|
| 2,985,023 | 5/1961 | Weiss et al. | 74—5.34 |
| 2,999,391 | 9/1961 | Freebairn et al. | 74—5.37 |
| 3,029,647 | 4/1962 | Picardi et al. | 74—5.37 |
| 3,055,223 | 9/1962 | Sedfield | 74—5.37 |

OTHER REFERENCES

Rosen, L.L.: Institute of Electrical and Electronic Engineers, International Convention on Military Electronics, Washington, D.C., September 1964, "Concepts of Gyro Monitoring as Applied to Long-Term-Inertial Navigation," pp. 193–197.

FRED C. MATTERN, JR., *Primary Examiner.*

SAMUEL FEINBERG, BENJAMIN A. BORCHELT, *Examiners.*

R. F. STAHL, P. W. SULLIVAN, *Assistant Examiners.*